(12) United States Patent
Sogani et al.

(10) Patent No.: US 10,180,833 B2
(45) Date of Patent: Jan. 15, 2019

(54) COOPERATIVE WEB-ASSISTED DEEP LINK REDIRECTION

(71) Applicant: Samsung Electronics Co., Ltd., Suwon-si, Gyeonggi-do (KR)

(72) Inventors: Shravan Sogani, San Ramon, CA (US); Jason Smith, San Francisco, CA (US); Marshall Quander, Mountain View, CA (US); Kenji Miwa, San Jose, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 183 days.

(21) Appl. No.: 14/986,434

(22) Filed: Dec. 31, 2015

(65) Prior Publication Data
US 2017/0192766 A1    Jul. 6, 2017

(51) Int. Cl.
*G06F 17/30* (2006.01)
*G06F 8/61* (2018.01)
(Continued)

(52) U.S. Cl.
CPC .......... *G06F 8/61* (2013.01); *G06F 17/30882* (2013.01); *H04L 67/02* (2013.01); *H04L 67/34* (2013.01); *G06F 8/71* (2013.01)

(58) Field of Classification Search
CPC .................. G06F 8/61; G06F 8/71; G06F 17/30861–17/30887; H04L 67/02; H04L 67/34
See application file for complete search history.

(56) References Cited

U.S. PATENT DOCUMENTS 6,167,441 A * 12/2000 Himmel ............ G06F 17/30905
  707/999.104
2013/0304729 A1 * 11/2013 Jiang ................ G06F 17/30905
  707/723

(Continued)

OTHER PUBLICATIONS

Arunachalam, Kalaiselvi, and Gopinath Ganapathy. "The Comparison of Inter-Application Communication Mechanisms in Mobile Operating Systems." (Year: 2015).*

(Continued)

*Primary Examiner* — Chameli Das
*Assistant Examiner* — Joanne G Macasiano
(74) *Attorney, Agent, or Firm* — Jefferson IP Law, LLP

(57) ABSTRACT

A system provides a software object to a developer for incorporation into an application. The software object includes processor-executable instructions that, upon installation of the software object in a mobile device, register a first domain with an operating system of the mobile device. In response to receiving a first deep link from the operating system, the software object determines whether the corresponding app is installed and, if so, selects a first format and transmits the first deep link using the first format. A web redirection server listens for HTTP requests at the first domain and, in response to receiving an HTTP request, prepares and transmits a redirection message to a source of the HTTP request. The redirection message includes a plurality of access mechanisms associated with the designated state of the designated application. The redirection message includes software instructions configured to select and actuate one of the access mechanisms.

14 Claims, 11 Drawing Sheets

(51) Int. Cl.
    *H04L 29/08*     (2006.01)
    *G06F 8/71*     (2018.01)

(56) References Cited

U.S. PATENT DOCUMENTS

| | | | | |
|---|---|---|---|---|
| 2014/0164909 | A1* | 6/2014 | Graff | G06F 17/30899 |
| | | | | 715/234 |
| 2014/0280015 | A1* | 9/2014 | Marantz | G06F 17/3097 |
| | | | | 707/710 |
| 2015/0143211 | A1* | 5/2015 | Kaufthal | G06F 17/24 |
| | | | | 715/205 |
| 2016/0142859 | A1* | 5/2016 | Molinet | H04W 4/003 |
| | | | | 709/203 |
| 2016/0234330 | A1* | 8/2016 | Popowitz | H04L 67/2814 |
| 2017/0097969 | A1* | 4/2017 | Stein | G06F 17/30557 |

OTHER PUBLICATIONS

Andrzejczak, Jaroslaw, Rafał Szrajber, and Maria Pietruszka. "Indexed Information-Rich Virtual Environments: Innovative Solution for Indexing and Searching Content in the 3D Web." IT Tools in Management and Education, Selected Problems: pp. 179-189. Year: 2011).*

* cited by examiner

COOPERATIVE WEB-ASSISTED DEEP LINK REDIRECTION

FIELD

The present disclosure relates to traversing links on a mobile device and more particularly to links pointing directly into mobile device apps.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

On mobile devices, search results, advertisements, and other content may be associated with links that are followed when the content is selected or otherwise interacted with. These links traditionally are to websites and include a URL (Uniform Resource Locator) with an HTTP: or HTTPs: scheme. These links, whether encountered in a web browser, a native application (app), or a launcher app, may be handled by the default web browser on the device.

With more and more content being available in apps, and with increasing user interaction with apps, some links allow a native app on the mobile device to be opened. For example, a search for restaurants may return links to restaurant information on the web as well as a link to open a native app, such as the YELP restaurant review app.

Deep links allow a user to be taken directly into a specific state (or, screen) of an app. For example, a search for a particular restaurant may have results for the website of that restaurant as well as the specific state of the YELP app having information about that restaurant. While powerful, deep links are not necessarily easy to implement. For example, a deep link in a web page rendered by a browser may not have direct access to information about the native apps installed on the mobile device.

Therefore, code associated with a deep link may make educated guesses about the format and availability of deep links. With the huge variety of operating system versions, web browsers, and versions of those web browsers, code attempting to effectuate deep links is very complicated. Depending on the browser, the operating system, and the code associated with a deep link, attempting to traverse a deep link for a YELP state may fail if the YELP app is not installed, or instead may be redirected to a web edition of the YELP app. In fact, some deep link formats may even crash a browser session.

One example format of a deep link may be a URL with a custom scheme. For example, for the YP business directory app, a scheme of "YP" may be registered with the operating system. A deep link for a business with an ID of 123 may be "yp://id/123," although no consistent format is required for such custom scheme deep links. As another example, a deep link may appear to be a standard HTTP URL, such as "HTTP://yp.com/business/123." Although this is a standard URL that can be passed to a browser, if the YP app has been installed, the domain "YP.com" may have been registered with the operating system so that the URL will be passed to the YELP app instead of to the browser.

Some mobile browsers, such as a recent version of Chrome, provide formal support for deep link redirecting. The native deep link URL can be broken down into parameters of an "intent" URI. The parameter "S.browser_fallback_url" will handle redirection to a fallback URL if the app is not installed. Many other mobile browsers do not provide formal support for deep link redirection so a variety of workarounds have been implemented to execute the desired redirection behavior. One approach is to open the deep link inside a hidden iframe to hide any "invalid URL" error messaging, and then attaching an event listener to the iframe to detect if the native app opened or not.

Yet another form of deep link is a data structure that includes parameters related to the app, the desired function, and the entity of interest (such as the business having the ID of 123). For the ANDROID operating system, this data structure may be a JAVA object called an intent. This object may not be interpretable by a browser, so if the corresponding app is not installed, resulting behavior may be undefined.

Another approach to deep links is user interface (UI) scripting, which, after opening an app, sends user interface events to the app to navigate to the desired state. Such a script may, in some implementations, be extended to download and install the app if the app is not yet installed. After the app is installed, the script will open the app and then navigate to the desired state. To provide user interface events, and in some implementations to read information from the app in order to send the correct UI events, an accessibility interface may be used. The accessibility interface may be provided by the operating system to privileged apps to allow UI automation. The term deferred deep-linking may refer to any access mechanism that first installs the application prior to navigating to the desired state.

SUMMARY

A system includes a distribution system configured to provide a first software object to a developer for incorporation into an application. The first software object includes processor-executable instructions that, upon installation of the first software object in a mobile device, register a first domain with an operating system of the mobile device. The processor-executable instructions, in response to receiving a first deep link from the operating system, the first deep link indicating a first app, (i) determine whether the first app is installed on the mobile device and (ii) in response to determining that the first app is installed on the mobile device, select a first format and transmit the first deep link to the first app using the first format. The system includes a web redirection server configured to listen for HTTP (hypertext transfer protocol) requests at an internet protocol (IP) address associated with the first domain by the domain name system (DNS). In response to receiving a first HTTP request indicating a designated state of a designated application, the web redirection server prepares and transmits a redirection message to a source of the first HTTP request. The redirection message includes a plurality of access mechanisms associated with the designated state of the designated application. The redirection message includes software instructions configured to (i) select one of the access mechanisms and (ii) actuate the selected access mechanism.

In other features, the web redirection server is configured to transmit the redirection message in an HTTP response. In other features, the software instructions of the redirection message are executable within a web browser. In other features, the software instructions of the redirection message include JavaScript instructions. In other features, the redirection message includes software instructions configured to determine a browser version and select the one of the access mechanisms based on the determined browser version.

In other features, the first software object includes processor-executable instructions that, in response to receiving the first deep link from the operating system and determining that the first app is not installed on the mobile device, one of (i) send a uniform resource locator (URL) to a browser of the mobile device, the URL indicating a domain associated with a web edition of the first app and (ii) download and install the first app from a digital distribution platform.

In other features, the system includes a search system configured to provide a plurality of results to a user device in response to a query. Each of the plurality of results includes data about a state of an application and a deep link corresponding to the state of the application. A domain of each of the deep links of the plurality of results is set to the first domain. In other features, each of the plurality of results includes text and at least one image specific to the corresponding state of the corresponding application.

In other features, the system includes an advertising server configured to provide an advertisement to a user device. The advertisement includes text and at least one image specific to a state of an application. The advertisement includes a deep link for directing the user device to the state of the application. A domain of the deep link is set to the first domain. In other features, the first software object includes processor-executable instructions that render received image and textual data into a deep view card for presentation on the mobile device.

A method includes providing a first software object to a developer for incorporation into an application. The first software object includes processor-executable instructions that, upon installation of the first software object in a mobile device, register a first domain with an operating system of the mobile device. The first software object includes processor-executable instructions that, (i) in response to receiving a first deep link from the operating system, the first deep link indicating a first app, determine whether the first app is installed on the mobile device and (ii) in response to determining that the first app is installed on the mobile device, select a first format and transmit the first deep link to the first app using the first format. The method includes listening for HTTP (hypertext transfer protocol) requests at an internet protocol (IP) address associated with the first domain by the domain name system (DNS). The method includes, in response to receiving a first HTTP request indicating a designated state of a designated application, preparing and transmitting a redirection message to a source of the first HTTP request. The redirection message includes a plurality of access mechanisms associated with the designated state of the designated application. The redirection message includes software instructions configured to (i) select one of the access mechanisms and (ii) actuate the selected access mechanism.

In other features, the redirection message is transmitted in an HTTP response. In other features, the software instructions of the redirection message are executable within a web browser. In other features, the software instructions of the redirection message include JavaScript instructions. In other features, the redirection message includes software instructions configured to determine a browser version and select the one of the access mechanisms based on the determined browser version.

In other features, the first software object includes processor-executable instructions that, in response to receiving the first deep link from the operating system and determining that the first app is not installed on the mobile device, one of (i) send a uniform resource locator (URL) to a browser of the mobile device, the URL indicating a domain associated with a web edition of the first app and (ii) download and install the first app from a digital distribution platform. In other features, the method includes providing a plurality of results to a user device in response to a query. Each of the plurality of results includes data about a state of an application and a deep link corresponding to the state of the application. A domain of each of the deep links of the plurality of results is set to the first domain.

In other features, each of the plurality of results includes text and at least one image specific to the corresponding state of the corresponding application. In other features, the method includes providing an advertisement to a user device. The advertisement includes text and at least one image specific to a state of an application. The advertisement includes a deep link for directing the user device to the state of the application. A domain of the deep link is set to the first domain. In other features, the first software object includes processor-executable instructions that render received image and textual data into a deep view card for presentation on the mobile device.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

DETAILED DESCRIPTION

Figure 1:
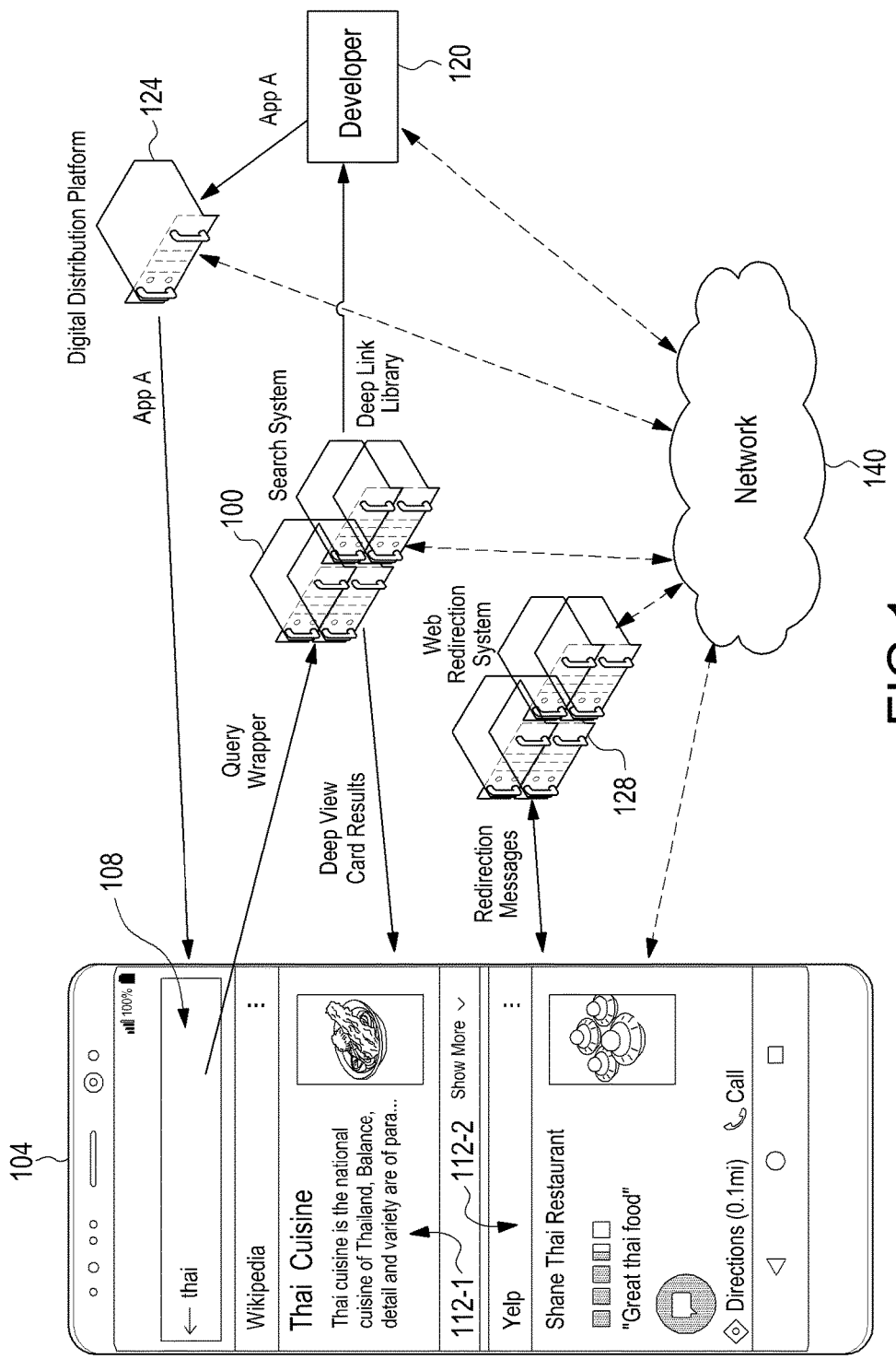
FIG. 1 is a combined functional block diagram and example user interface showing mobile search results according the principles of the present disclosure.

When a search system, advertising server, or other content provider delivers a deep link to a mobile device, the deep link may be associated with a graphical result, referred to as a deep view card (DVC). A DVC for an app or a state of an app shows additional information, not just the identification of the app or app state. For example, the information may include a title of the app state or a description of the app state, which may be a snippet of text from the app state. Other metadata may be provided from the app state, including images, location, number of reviews, average review, and status indicators. For example, a status indicator of "open now" or "closed" may be applied to a business depending on whether the current time is within the operating hours of the business.

Some DVCs may emphasize information that led to the DVC being selected as a search result. For example, text within the DVC that matches a user's query may be shown in bold or italics. The DVC may also incorporate elements that allow direct actions, such as the ability to immediately call an establishment or to transition directly to a mapping app to get navigation directions to the establishment.

Other interactions with the DVC (such as tapping or clicking any other area of the DVC) may take the user to the indicated state or app. As described in more detail below, this may be accomplished by opening the relevant app or, if the app is not installed, opening a website related to the desired app state. In other implementations, an app that is not installed may be downloaded, installed, and then executed in order to reach the desired app state.

In other words, a DVC includes identifying information for the app or state as well as additional content from the app or state itself. The additional content allows the user to make a more informed choice about which result to choose, and may even allow the user to directly perform an action without having to navigate to the app state. If the action the user wants to take is to obtain information, in some circumstances the DVC itself may provide the necessary information to accomplish such action.

The deep link may be associated with code that attempts to follow the deep link upon selection by a user of the mobile device. The code may also render a DVC based on text and images provided with a deep link. For example, the code may scale an image and reflow text based on a size of a frame in which the DVC will be presented. The code may include, when displaying the deep links in a browser or browser control, JavaScript.

The code may attempt to detect whether it is executing within a browser component (for example, a WebView component in the ANDROID operating system), which may have various restrictions impacting the ability of the deep link to link into the associated app. If the code detects it is running inside of a limited browser component, the code may make a call to a URL in order to open a full browser process in which the code can run. The URL may point back to the system from which the deep link was received and may return the same code that was previously executing in the restricted browser component. In the ads use-case, standardized JavaScript APIs such as the Mobile Rich Media Ad Interface Definitions (MRAID) are useful to detect this environment and open the full browser accordingly.

When the code is executing within the full browser, the code may attempt to determine the browser identity and version number, information about the operating system (including version number) and information about installed apps. This information may all be used to determine which deep link approach is most likely to work and least likely to cause a crash or an unwanted error message.

However, much of this information may be unreliable or entirely unavailable to code executing within a browser. Therefore, the provider of the deep link may offer a deep link library to be downloaded to user devices. This deep link library may facilitate the handling of deep links. If code in a browser is able to pass the deep link to the deep link library, the deep link library installed on the mobile device may be able to accurately determine which apps are installed and how best to handle the deep link.

The deep link library may be incorporated into apps by developers interested in facilitating deep links especially to their own apps. The deep link library may also be incorporated into an operating system, a browser, a launcher app (which may have elevated privileges compared to a normal app), or a search-specific app.

However, the deep link library is unlikely to be installed on every device to which a deep link may be sent. Therefore, the present disclosure describes a mechanism for attempting to send a deep link to the deep link library, but if the deep link library is not installed, the web programming code described above can be used to make a best effort at following the deep link.

This may be accomplished by hosting a web server at a specific URL and then configuring the deep link library to register the domain of that URL with the operating system. Then, if the deep link library is installed on a mobile device, a call to that URL will be directed to the deep link library instead of to the web server. For example, if the web server is registered at the domain "quixey.io", then the initial deep link may begin with HTTP://quixey.io/ or HTTPs://quixey.io. The remainder of the URL identifies a target of the deep link, which may include a designation of an app, a function, and an entity on which that function is to be performed.

This standard-looking URL can be handled by the web server, which will respond with code that attempts to follow the deep link. The code provided by the web server may be tailored to the apparent device, operating system type, and browser version, all of which may be inferred to varying degrees from information in the HTTP request, such as a user-agent string.

However, if a deep link library has been installed on the device and has registered the quixey.io domain, the operating system will pass the HTTP://quixey.io/ . . . URL to the deep link library instead of to the web server. The deep link library can then query the installed applications on the mobile device and determine whether the app is installed, whether the app can be installed, and the best way of directing the user to the content of interest.

FIG. 1 shows a search system 100 providing results to a user device 104. The user device 104 is depicted as a smartphone, but could be any other type of user device, such as a laptop, tablet, smartwatch, or desktop computer. The results include deep links, and may be associated with rich content, such as DVCs. Although FIG. 1 shows DVCs being provided by the search system 100, other sources of content, such as an advertising server or a content engine, may provide DVCs and deep links.

The ability to direct the query to search system 100 may be built into an operating system of the user device 104, into a launcher app installed on the user device 104, into a search-system-specific app, or, using a software development kit (SDK), into any other app. The search system 100 may be queried indirectly through a web server (not shown) that can be accessed by any web browser.

In one example, a textbox 108 allows the user to type, speak, paste, or otherwise supply text. In this example, the text is sent in a query wrapper to the search system 100. The query wrapper includes an implicit or explicit query, such as text entered by the user. The query wrapper may also include context information, such as a location of the user device 104, installed apps on the user device 104, and accounts active on the user device 104. The search system 100 analyzes the query wrapper, identifies relevant results, and responds to the user device 104 with results. These results may take the form of DVCs, each with an associated deep link.

For example, a query for "thai" may return a first DVC 112-1 for the WIKIPEDIA online encyclopedia app and a second DVC 112-2 for the YELP restaurant app. In response to the user selecting the DVC 112-1, such as by tapping, a corresponding deep link is followed to attempt to take the user directly to the state of the WIKIPEDIA app titled "Thai Cuisine." Meanwhile, selecting the DVC 112-2 will follow a deep link to the "Shang Thai Restaurant" state of the YELP app.

The search system 100, or another server operated by the search system 100, provides a deep link library to interested developers, such as a developer 120. The developer 120 may implement the deep link library into a first app ("app A"). The developer 120 uploads app A to a digital distribution platform 124. The digital distribution platform 124 distributes apps to devices such as the user device 104. Popular digital distribution platforms include the GOOGLE PLAY distribution platform from Google, Inc. and the APP STORE digital distribution platform from Apple, Inc.

If the user device 104 has acquired app A from the digital distribution platform 124, the user device now has the deep link library to handle the deep links associated with the DVCs 112-1 and 112-2. If multiple apps having the deep link library are installed, in some implementations, only the first will register its deep link library with the operating system. In other implementations, each will register its deep link library, but the operating system will default to providing deep links to the first deep link library. In yet other implementations, each will register its deep link and a user will be prompted regarding which app should handle deep links when the first deep link is actuated. The user's first choice may be stored so that the user is not prompted again.

As described in more detail, if the deep link library is not present on the user device, actuating one of the deep links corresponding to the DVCs 112-1 or 112-2 may cause a web redirection system 128 to be accessed. The web redirection system 128 provides a message to the user device 104 with information on how best to follow the deep link in the absence of an installed deep link library. The redirection message from the web redirection system 128 may include code that attempts to identify the presence of applications and the most reliable mechanism of following a deep link. In various implementations, the code includes JavaScript code.

The web redirection system 128 reserves the domain associated with the deep link library (such as "quixey.io") with a domain name registrar. As a result, public domain name system (DNS) servers will direct DNS lookups for that domain to one or more internet protocol (IP) addresses of the web redirection system 128.

While the dataflow in FIG. 1 is shown with solid lines, the various systems and devices of FIG. 1 may actually communicate with each other via network 140. The network 140 may include wired and wireless local area networks, personal area networks, and wide area networks such as the internet.

Figure 2:
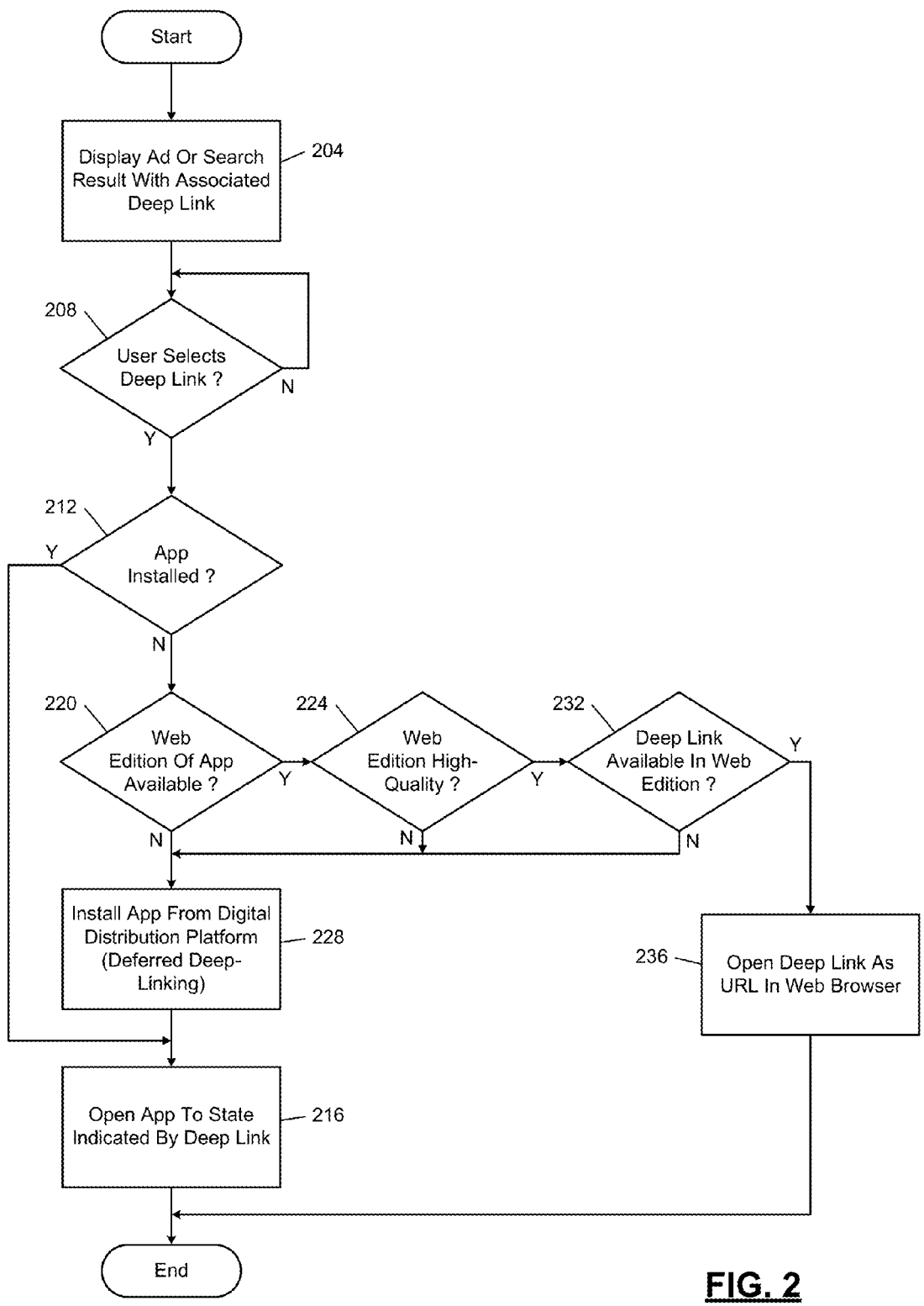
FIG. 2 is a flowchart of example business rules for determining which actions to perform in traversing a deep link.

In FIG. 2, a flowchart depicts example business rules for how to best handle a deep link assuming knowledge of app installation and availability and quality of web editions of the app. Control begins at 204, where a display ad, search result, or other content is displayed. This content has an associated deep link. At 208, control remains until the user selects the content, thereby actuating the deep link. At 212, control determines whether the app indicated by the deep link is installed. If so, control transfers to 216; otherwise, control transfers 220.

At 220, control determines whether a web edition of the app is available. If so, control transfers to 224; otherwise, control transfers to 228. At 224, control determines whether the web edition of the app for the particular state indicated by the deep link is known to be high quality. If so, control transfers to 232; otherwise, control transfers to 228. The quality decision may be made based on general information, such as the web edition not being a direct mirror of the app content. If, however, empirical evidence is that many app states are not reflected into the web edition, an assumption may be made that the web edition will not high-quality for the specific state.

At 232, control determines whether a deep link can be created specific to the web edition. For example, if the URL scheme for the web edition requires knowledge of a particular unique identifier, and that unique identifier is not yet known for the particular entity indicated by the deep link, creation of the deep link will not be possible. If the deep link is available, control transfers to 236; otherwise, control transfers to 228. At 236, control opens a URL in a web browser. The URL may be the same string as the deep link or may be a transformed version of the original deep link. Control then ends.

At 228, the app is not installed and therefore a script or other procedure call is made to install the app from a digital distribution platform. Because of the delay in downloading and installing, this is referred to as deferred deep-linking. Control then continues at 216. At 216, the app is installed and therefore the app is opened to a state indicated by the deep link. As described above there are multiple ways of opening an app to a particular state, and control selects the one that is most likely to work based on the operating system version, browser version, etc. Control then ends.

Figure 3:
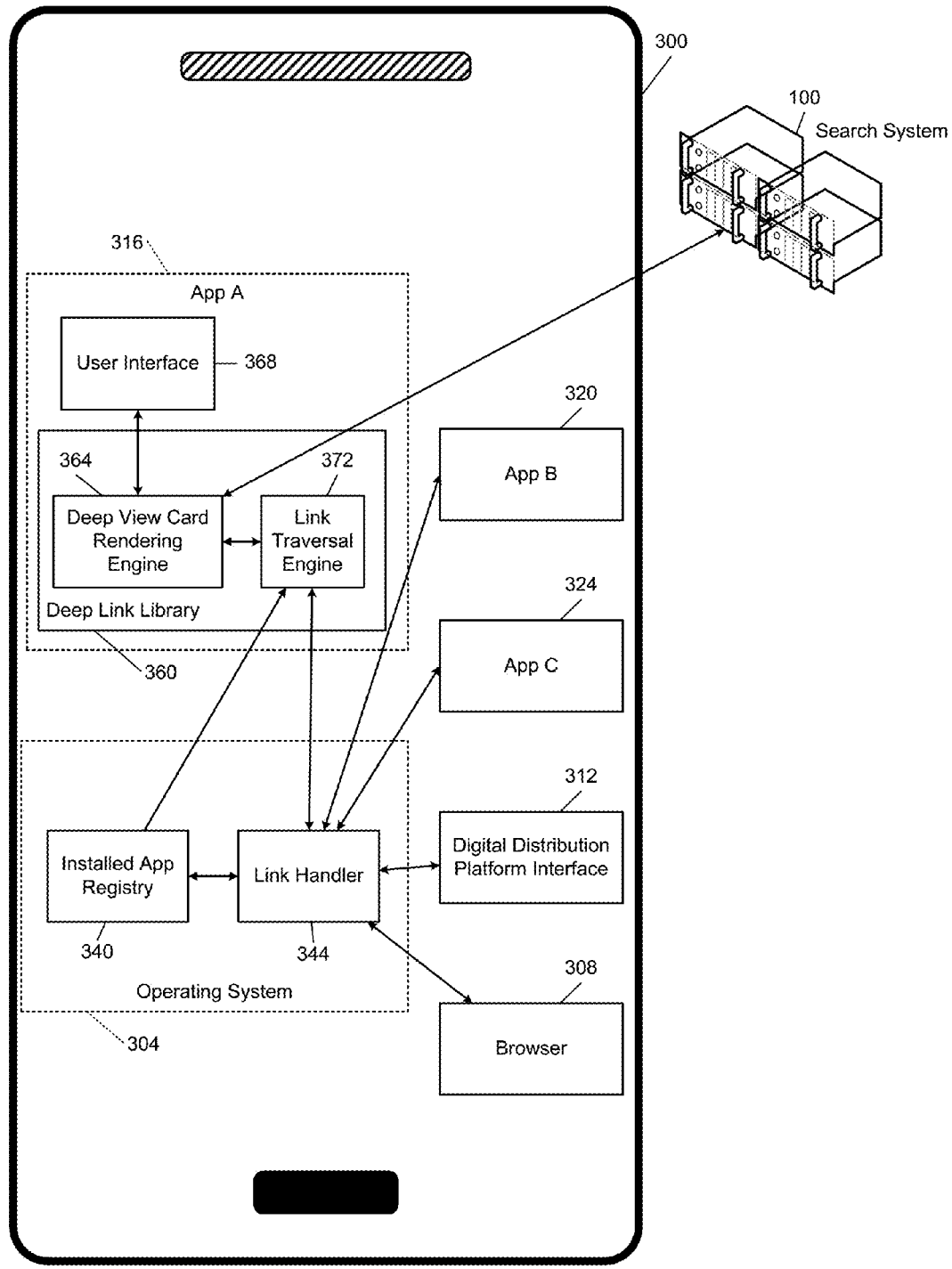
FIG. 3 is functional block diagram of a mobile device with an app having a deep link library according to the principles of the present disclosure.

In FIG. 3, an outline of a user device 300 includes functional blocks related to code present in the user device 300. The user device 300 includes an operating system 304, a browser 308, a digital distribution platform interface 312, and three example apps, App A 316, App B 320, and App C 324.

The operating system 304 may include an installed apps registry 340 and a link handler 344. The link handler 344 receives links, such as URLs (and objects, such as the intents of the ANDROID operating system). The link handler 344 determines whether one of the apps in the installed apps registry 340 has claimed a particular domain, scheme, or other filter that matches a link. If not, the link may be passed to the browser 308 if the scheme is one of a set of recognized protocols. For example, the recognized protocols may include HTTP, HTTPs, ftp, telnet, and gopher.

The digital distribution platform interface 312 may be registered with a certain URL, and therefore instead of opening a website of the digital distribution platform, an app associated with the digital distribution platform is opened.

The link may even direct the digital distribution platform to begin downloading a particular app.

Similarly, the link handler 344 directs links to one of App A 316, App B 320, and App C 324 based on any registrations the apps have made. For example, a deep link library 360 of App A 316 may have registered a specific scheme or domain, such as the "quixey.io://" scheme. Then, the deep link library 360 will receive from the link handler 344 any links prefixed with "quixey.io://". Even when using web redirection, described in more detail below, where "https://quixey.io" may be registered, the deep link library 360 may still register a custom scheme such as "quixey.io://" for backward compatibility.

The deep link library 360 may include a DVC rendering engine 364, which reformats, assembles, and reflows data to provide DVC content to a user interface 368 of App A 316. In the example of FIG. 3, the DVC content is received from the search system 100, but as described above, content with deep links may be received from advertising engines and other sources.

The deep link library 360 also includes a link traversal engine 372 that identifies how best to handle the deep link, such as based on the decision process of FIG. 2, and then how to follow the deep link. For example, the link traversal engine 372 may consult the installed app registry 340 to determine whether an app specified by a deep link is installed. The link traversal engine 372 may also identify the version of the operating system 304, which may indicate the abilities of the link handler 344.

Because the deep link library 360 is registered with the installed app registry 340, the link handler 344 can pass deep links from App B 320 and App C 324 to the deep link library 360. However, when App B 320 or App C 324 has a deep link to traverse, these apps may not be aware of the existence of the deep link library 360. Especially when content is rendered within a web controller (such as the WebView component of the ANDROID operating system), the code associated with the deep link may not be able to query the installed app registry 340 or the link handler 344 to determine whether the deep link library 360 exists on the user device 300.

Figure 4:
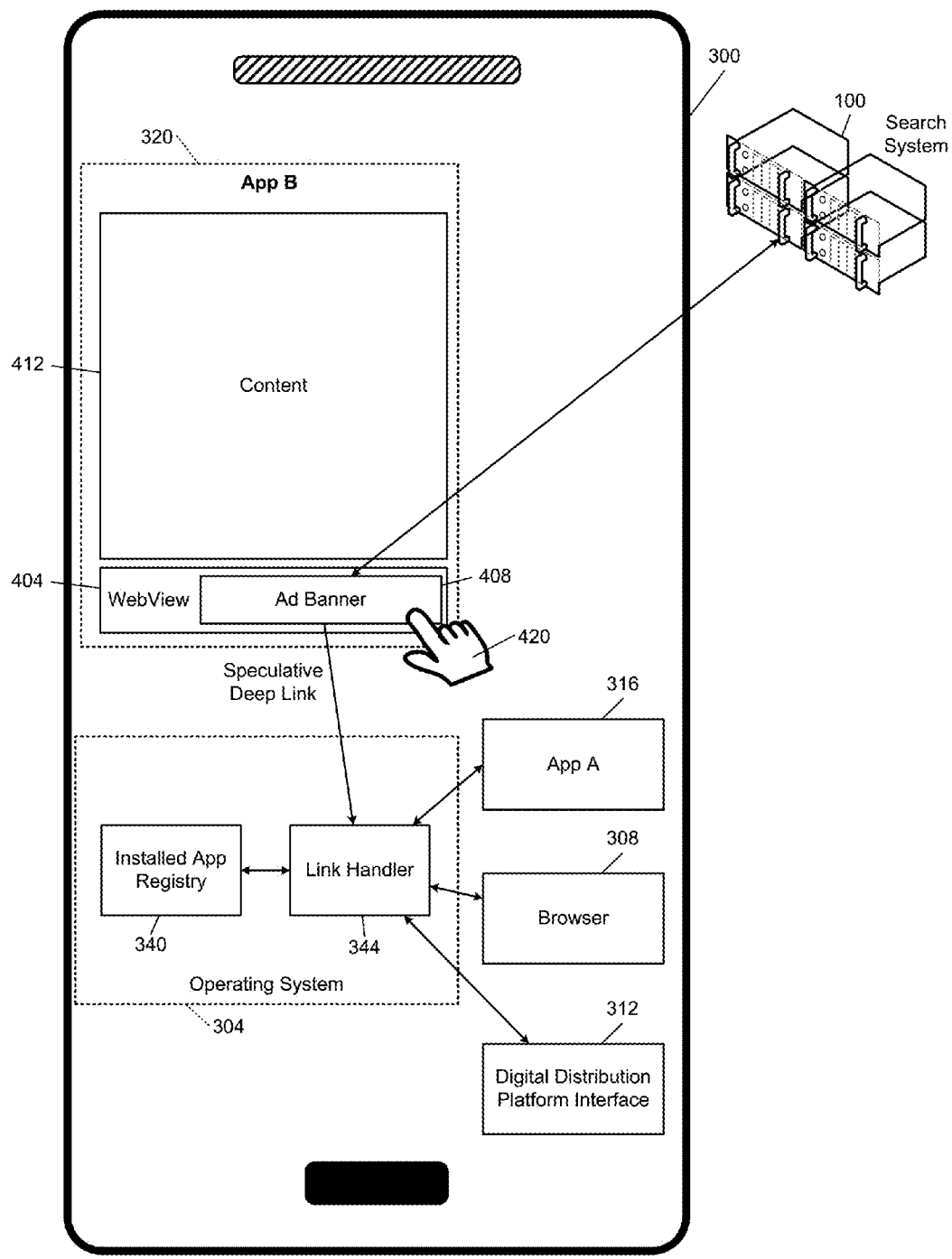
FIG. 4 is a functional block diagram of a mobile device showing an app with a web browser component but no deep link library.

In FIG. 4, another functional view of the user device 300 is shown. App B 320 includes a WebView component 404 used to display an ad banner 408. Although the term WebView is generally associated with the ANDROID operating system, the general concept is that an embedded web browser or subset of web browser functionality may render web content within an app.

In this particular instance, the web content is the ad banner 408, which may be a combination of HTML (hypertext markup language) and JavaScript. App B 320 has content 412, which may also be served by a web browser or by custom user interface elements. The ad banner 408 is provided by the search system 100, which may be used by an advertising network to identify relevant content for displaying as an ad.

A miniaturized cartoon hand 420 is shown in FIG. 4 to represent selection by the user of the ad banner 408. In response to this selection, the ad banner 408 invokes a deep link with the operating system 304. However, because the code associated with the ad banner 408 may not be able to query installed apps, the code may have no idea whether a deep link library is present on the device 300. Therefore, the deep link provided to the link handler 344 is speculative, based on the best guess of the code associated with the ad banner 408.

In some implementations, a full browser will have more capabilities than the WebView 404. Therefore, the code associated with the ad banner 408 may pass a URL to the link handler 344, causing the browser 308 to retrieve the code associated with the ad banner 408 from the search system 100 and execute that code with the additional capabilities and additional access of the browser 308. In fact, in some implementations, the WebView 404 may not permit JavaScript to be executed. Therefore, the code associated with the ad banner 408 cannot be assumed to have executed.

As one solution, the search system 100 may supply a simple URL instead of code for the deep link. This URL is activated when the user selects the ad banner 408, which opens the URL in the browser 308 regardless of whether the ad banner 408 appeared in a full browser instance or a limited WebView component. This URL can then download the code that should be executed in a full browser instance.

Figure 5:
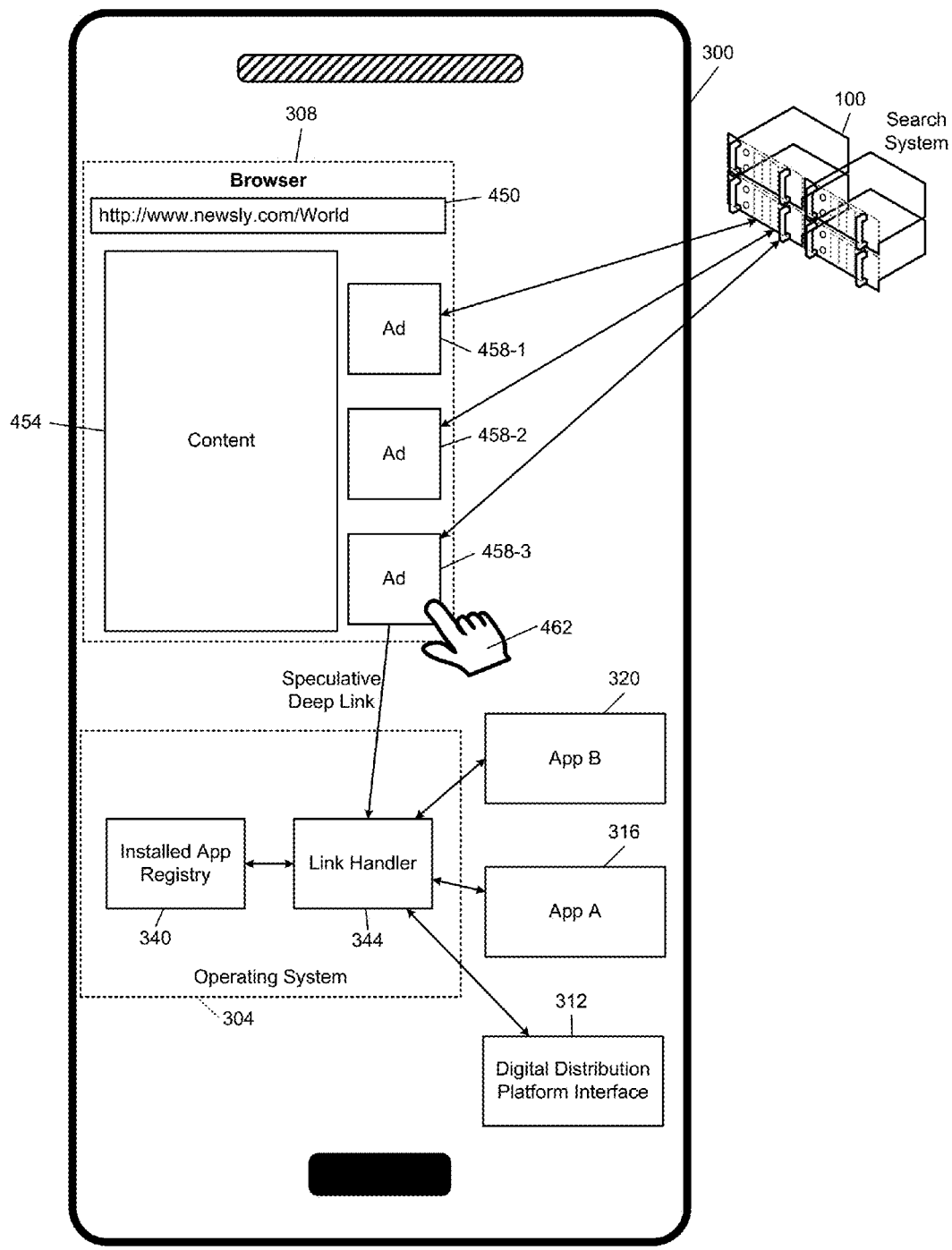
FIG. 5 is a functional block diagram of a mobile device without an installed deep link library.

In FIG. 5, the browser 308 is shown with a location bar 450 indicating a web address that displays content 454 and ads 458-1, 458-2, and 458-3 (collectively, ads 458). The search system 100 provides content for the ads 458, which may include graphics, text, and deep links. In various implementations, the search system 100 may infer that the ads 458-1, 458-2, and 458-3 will be displayed in a full browser instead of an embedded browser control based on, for example, a user-agent string.

In such cases, the search system 100 may provide code to traverse the deep links. If the search system 100 is not able to conclusively determine that a full browser instance will display the ads 458, the search system 100 may provide URLs so that when one of the ads 458 is selected, the URL is opened in a full browser instance, at which point deep link handling code can be retrieved from the search system 100.

A hand 462 demonstrates selection of the ad 458-3. Based on this selection, code associated with the ad 458-3 attempts to determine the most effective way of following the deep link, and the deep link is provided to the link handler 344. The deep link is only speculative, however, because the code associated with the ad 458-3 has a limited insight into installed apps and supported deep link formats.

Figure 6:
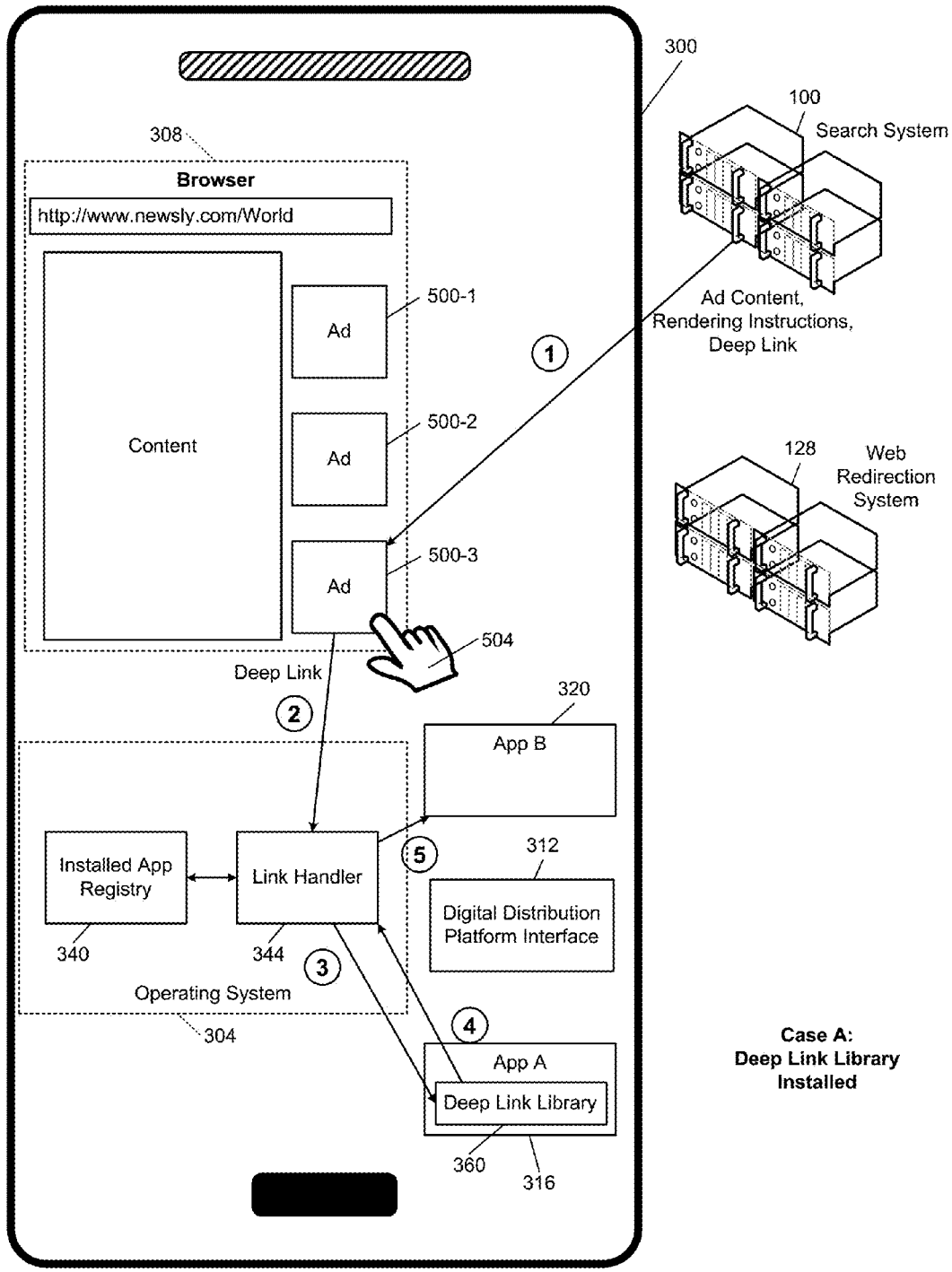
FIG. 6 is a functional block diagram example data exchange between a mobile device and a web redirection system when a deep link library is installed on the device.

In FIG. 6, the web redirection system 128 is used to provide web-assisted deep link redirection. The browser 308 displays ads 500-1, 500-2, and 500-3, which may be received from the search system 100. As demonstrated with circled numbers, a first message from the search system 100 provides ad content, rendering instructions, and a deep link for the ad 500-3.

When a user selects the ad 500-3, as indicated with a cartoon hand 504, a circled 2 indicates that a deep link is requested. The deep link request is handled by the link handler 344. This deep link follows the format of a web link (beginning with HTTP://), and corresponds to a domain where the web redirection system 128 is hosted as well as where any installed deep link library associated with the web redirection system 128 will be registered with the link handler 344.

In this way, if a deep link library has been installed, the registration in the installed app registry 340 will direct this URL to the deep link library instead of to the web, where the web redirection system 128 is located. In the example of FIG. 6, App A 316 includes the deep link library 360, which has registered the web redirection domain. Therefore, as indicated with a circled 3, the link handler 344 passes the URL to the deep link library 360.

The deep link library 360 then proceeds as described above to determine how best to follow the deep link. For illustration only, the deep link library 360 has determined that the deep link is associated with App B 320, that App B 320 is installed, and that the best approach for following the deep link is to pass a specific format of the deep link to App B 320.

The deep link library 360 then passes a specific deep link format to the link handler 344, indicated with a circled 4. A specific format chosen is a format recognized to be acceptable to the version of the operating system 304 installed as well as to App B 320. The deep link indicates App B 320, and therefore at the circled 5, the link handler 344 provides the deep link to App B 320. App B 320 responds by opening to a state indicated by the deep link.

Figure 7:
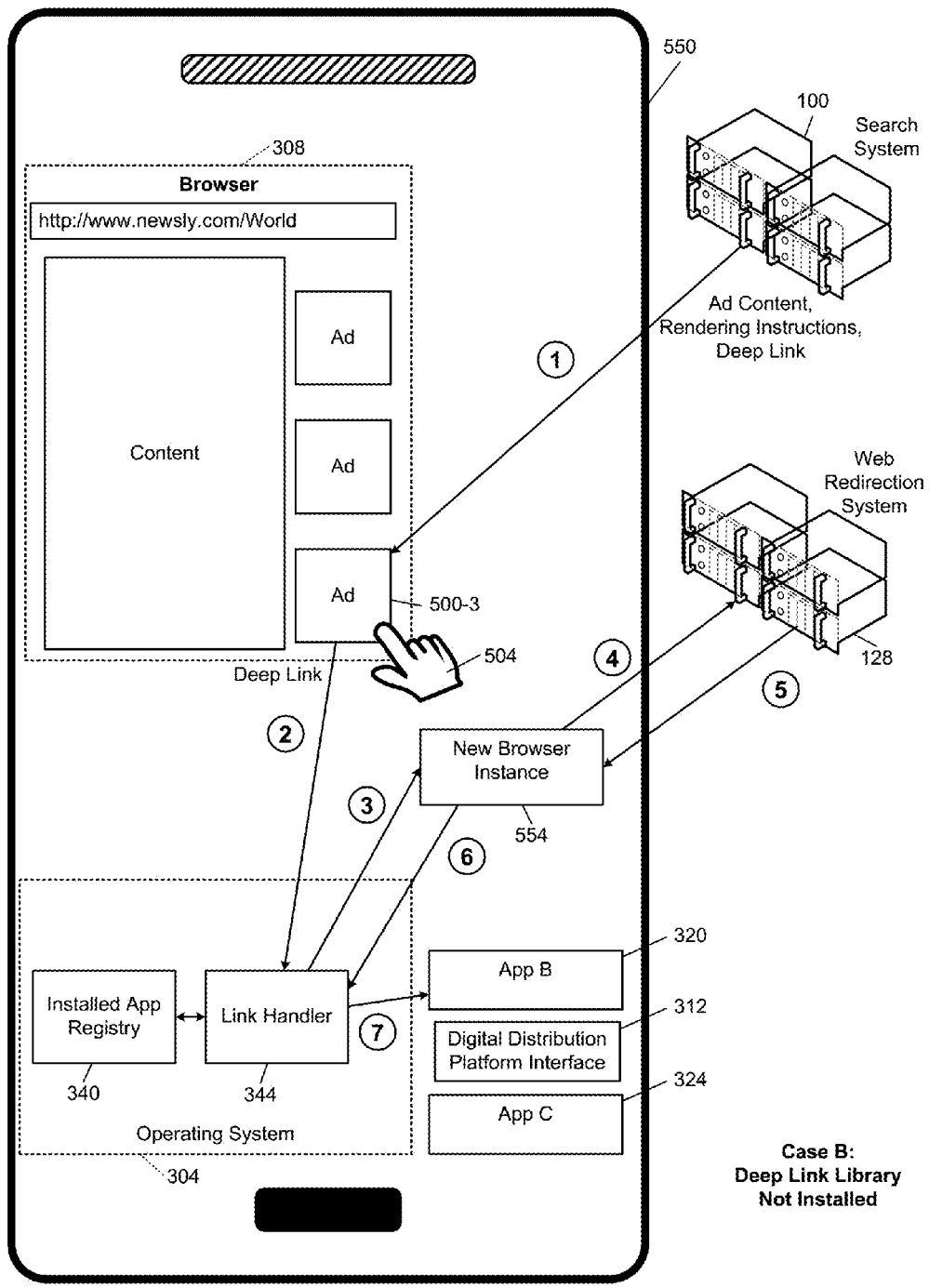
FIG. 7 is a functional block diagram of data exchange within a mobile device and a web redirection system when a deep link library is not installed on the device.

In FIG. 7, a user device 550 is, for illustration purposes only, identical to the user device 300 except that App A 316 is not installed on the user device 550. Therefore, the same reference numerals are used from FIGS. 3-6 to indicate the similarity of the elements. As in FIG. 6, the ad 500-3 is rendered (circled number 1) based on ad content, rendering instructions, and a deep link from the search system 100.

A hand 504 represents user selection of the ad 500-3, which causes a deep link URL to be provided (circled number 2) to the link handler 344. The domain associated with the URL has not been registered with the installed app registry 340 because no deep link library is installed. Therefore, the URL is passed to a new browser instance 554. The new browser instance 554 contacts the web server indicated by the URL and makes an HTTP request (circled number 4).

The web redirection system 128 recognizes that this request indicates a deep link library is not installed on the user device 550 and returns (circled number 5) deep link handling code to the new browser instance 554. The deep link handling code is executed in the context of the new browser instance 554 and attempts to determine the best way to traverse the deep link. In this example, the code determines that a particular deep link (circled number 6) can be sent to App B 320. The link handler 344 recognizes the deep link's target as being App B 320 and forwards the deep link (circled number 7) to App B 320.

Figure 8:
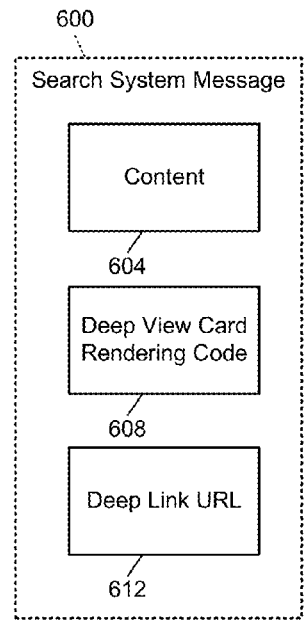
FIG. 8 is a graphical representation of an example format of a search system message.

In FIG. 8, an example implementation of a search system message 600 includes content 604, such as one or more images and text, and deep view card rendering code 608. The code 608 may determine the size of an area in which the DVC will be displayed and scales images and reflows text appropriately for display.

A deep link URL 612 indicates the action which will be taken when a user selects the DVC associated with the content 604. As described above, the deep link URL has a domain associated with both the web redirection system 128 and a deep link library associated with the web redirection system 128. As an example only, the deep link URL 612 may begin with HTTP://quixey.io/.

Figure 9:
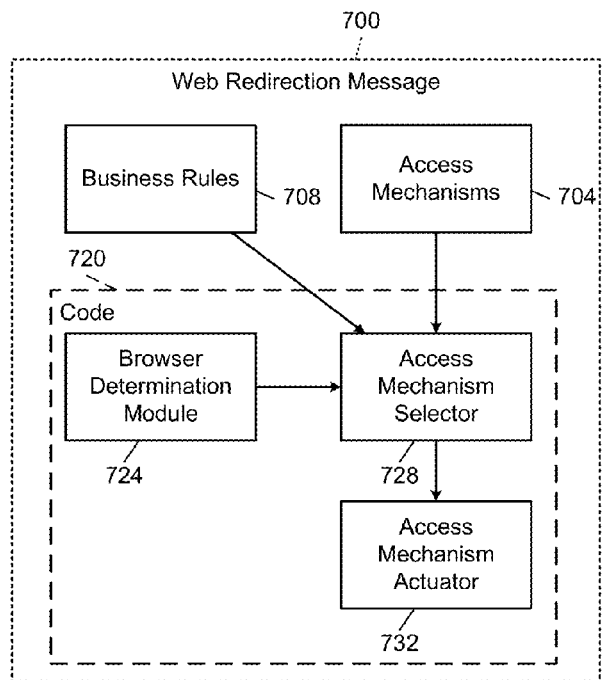
FIG. 9 is a graphical representation of an example format of a web redirection message.

In FIG. 9, an example web redirection message 700 sent from the web redirection system 128 to a browser when a deep link library is not installed in the device is shown. The web redirection message 700 includes one or more access mechanisms 704. These access mechanisms may include those described above, such as an HTTP URL deep link, a custom scheme deep link, etc.

The web redirection message 700 also includes business rules 708, which define an order of priority. For example, the business rules 708 may specify that if an app can be installed, installing the app is preferable to using a web edition of the app. The web redirection message 700 includes code 720, such as JavaScript code.

The code 720 includes a browser determination module 724, which attempts to determine the specific browser and version number, which may indicate the capability of the browser to handle different forms of deep links. The browser version may also indicate the operating system version, and in some implementations, the operating system version can be determined independently.

An access mechanism selector 728 first determines whether to send a web URL for a web edition of the app, whether to download the app, or whether the app is already installed. The access mechanism selector 728 then, if the app is already installed, determines which format of deep link will be handled best by the operating system and the target app. An access mechanism actuator 732 carries out the selected access mechanism. For example only, the access mechanism actuator 732 may include a script that downloads an app, waits for a period of time for the app to install, and then sends a deep link to the newly-installed app.

Figure 10:
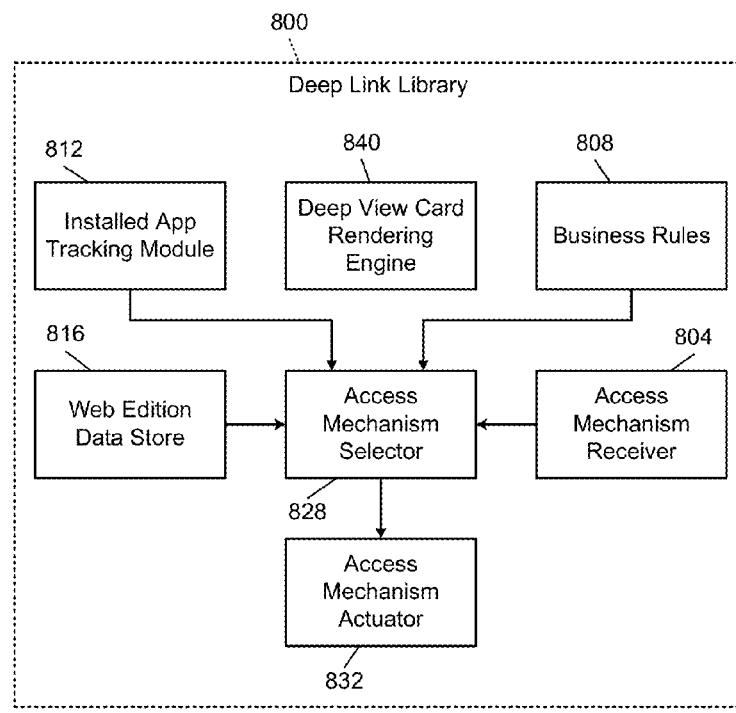
FIG. 10 is a functional block diagram of an example deep link library.

In FIG. 10, an example implementation of a deep link library 800 includes an access mechanism receiver 804. In some implementations, the deep link library 800 may receive a deep link, which is simply a URL. The deep link library 800 may therefore have to retrieve full access mechanisms related to that URL. These access mechanisms may be retrieved from the search system 100 or from the web redirection system 128. These access mechanisms may include templates, URLs, and specific identifiers that can be plugged into various deep link templates.

Business rules 808 dictate how best to traverse a deep link, such as by always opening the app if available, even if a web edition is also available. An installed app tracking module 812 may query the installed app registry 340 of the operating system and may also track such statistics as usage of each app. This information may be of interest to the search system 100, such as when ranking results.

A web edition data store 816 includes or can retrieve information about web editions of apps. To determine whether the web edition is a viable alternative to the app, this information may be stored per app or may be more granular, differing between entities and functions offered by the app. An access mechanism selector 828 selects an access mechanism to traverse the deep link based on the inputs received.

An access mechanism actuator 832 carries out the selected access mechanism. The access mechanism actuator 832 may pass a deep link to a link handler 344 of the operating system. The access mechanism actuator 832 may also interface with accessibility controls of a mobile device to allow for user interface automation, which may allow for installation of an app or navigation within an app.

A deep view card (DVC) rendering engine 840 may be used by an app within which the deep link library 800 is included. The DVC rendering engine may receive data, such as from a search system, and produce a DVC to be displayed in the app.

Figure 11:
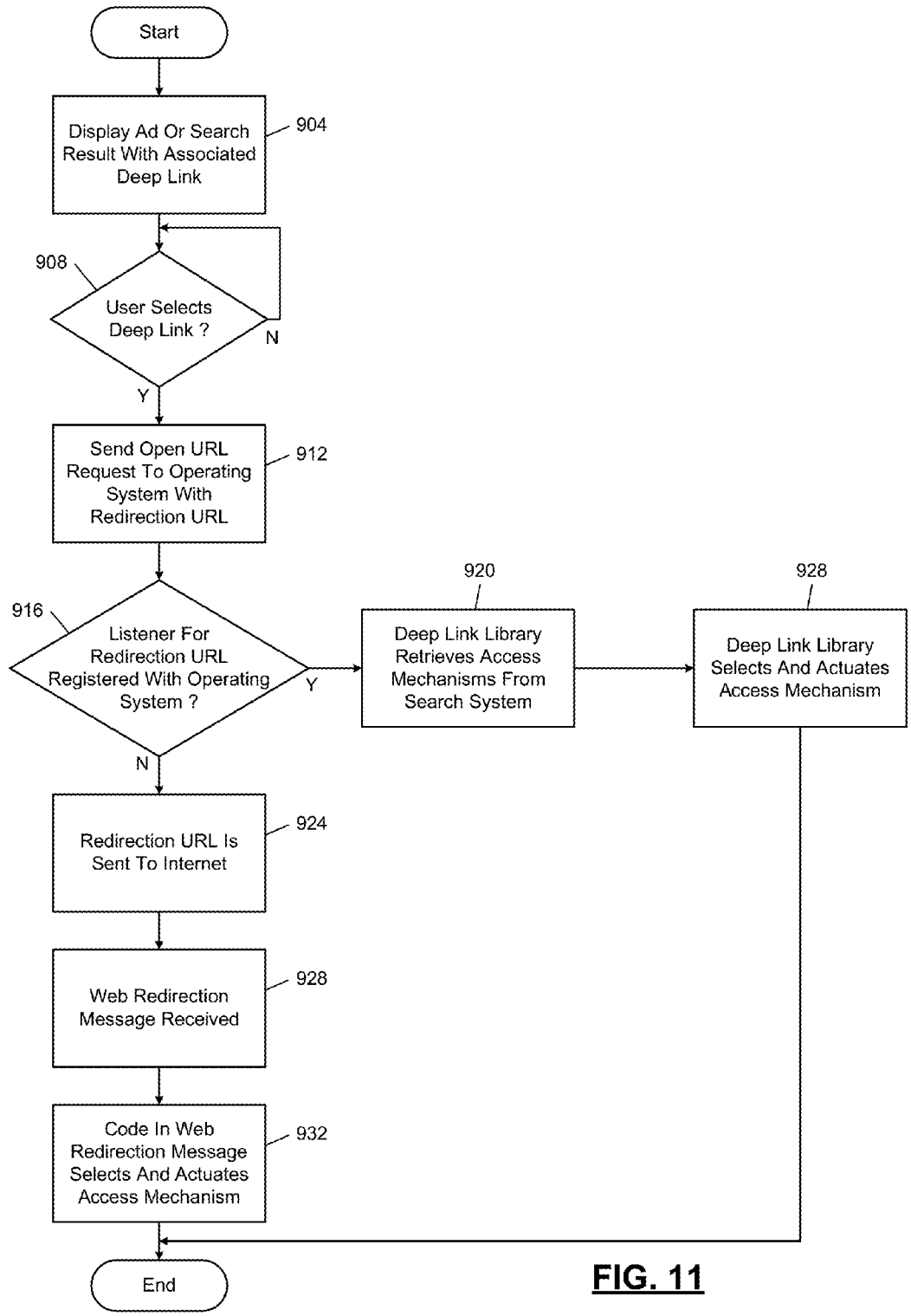
FIG. 11 is a flowchart of example deep link processing supported by a web redirection system.

In FIG. 11, web-assisted deep link redirection for a deep link begins at 904, where an ad or search result is displayed and has an associated deep link. At 908, control waits until the user selects the deep link and then proceeds to 912. At 912, control sends an open URL request to the operating system with a redirection URL. The redirection URL (which may begin with a domain such as HTTP://quixey.io/) indicates the target of the deep link.

At 916, if a listener has been registered for the redirection URL with the operating system, control transfers to 920; otherwise, control transfers to 924. At 920, the deep link library, which registered as the listener for a filter matching the domain of the redirection URL, retrieves one or more access mechanisms from the search system corresponding to the deep state indicated in the redirection URL. At 928, the deep link library selects from among the retrieved access mechanisms and actuates the selected access mechanism. Control for this deep link then ends.

At 924, the redirection URL is sent to the internet via a browser. At 928, the browser receives a web redirection message including deep link handling code. At 932, the deep link handling code from the web redirection message selects an access mechanism included in the web redirection message and actuates the access mechanism. Control then ends.

Figure 12:
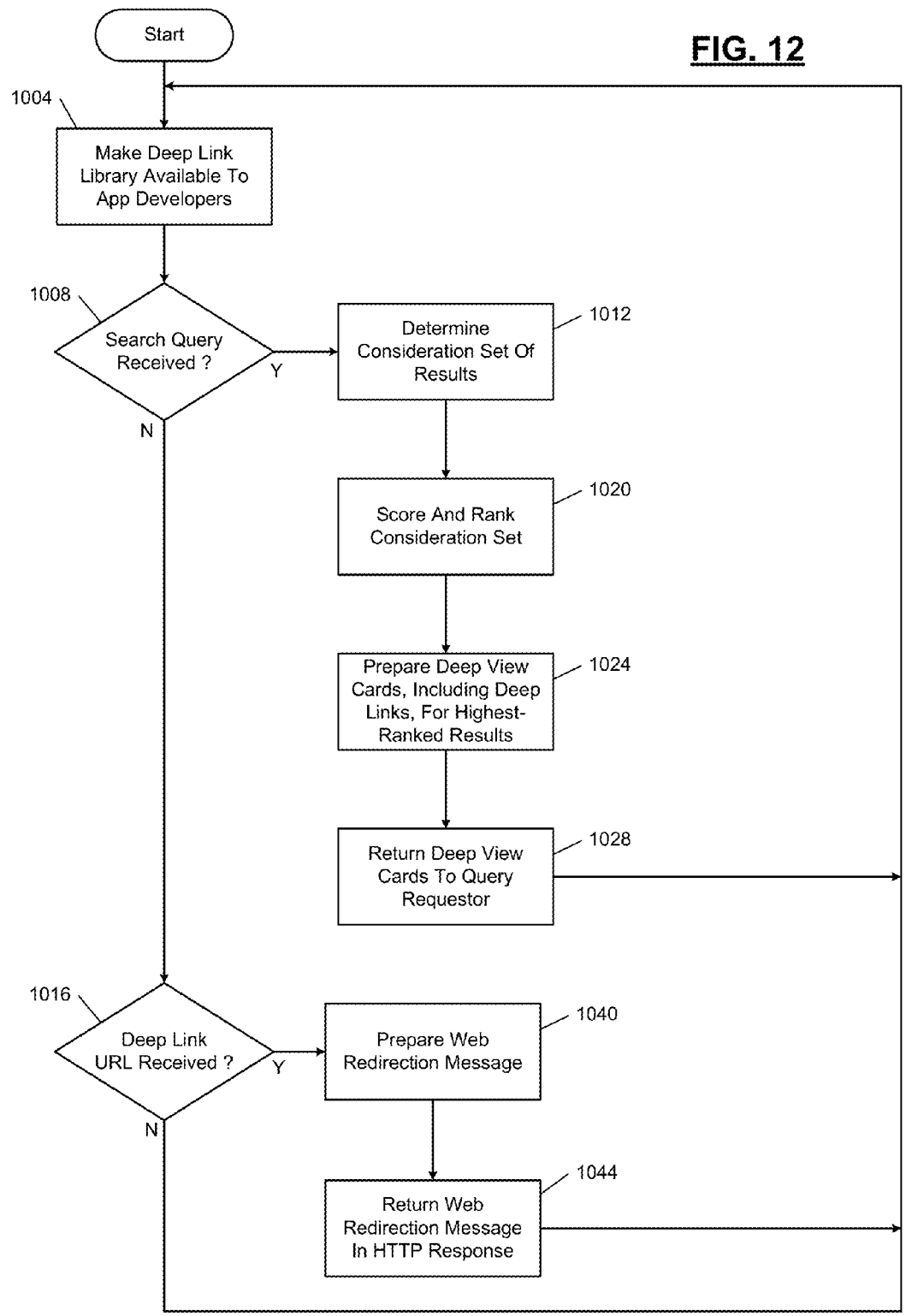
FIG. 12 is a flowchart of example operation of the search and web redirection systems.

In FIG. 12, a server-side operation of the present disclosure begins at 1004, where the deep link library is made available to app developers. The app developers can then download the deep link library and incorporate the deep link library into their apps to allow their apps to display DVC content and enable seamless deep linking to other apps.

At 1008, if a search query is received, control transfers to 1012; otherwise, control transfers to 1016. At 1012, control determines a consideration set of results corresponding to the search query. This consideration set may include apps relevant to the search query as well as specific states of apps relevant to the search query.

At 1020, control scores the elements in the consideration set based on how closely they match the understood intent of the search query. The scored results can then be ranked from most relevant to least relevant. At 1024, the highest-ranked results are formatted as deep view cards associated with deep links to the specific states of the results.

At 1028, control returns the deep view cards to the requestor of the query. The deep view cards may not be fully rendered, and instead include images, text, and instructions on how to render the deep view cards for particular sizes, orientations, and other requirements of the displaying program. Control then returns to 1004.

At 1016, if a deep link URL is received at the web redirection system, control transfers to 1040; otherwise, control returns to 1004. At 1040, control prepares a web redirection message including access mechanisms corresponding to the deep link URL and code for selecting and actuating an access mechanism. At 1044, control returns the web redirection message to the requestor in an HTTP response. Control then returns to 1004.

Figure 13:
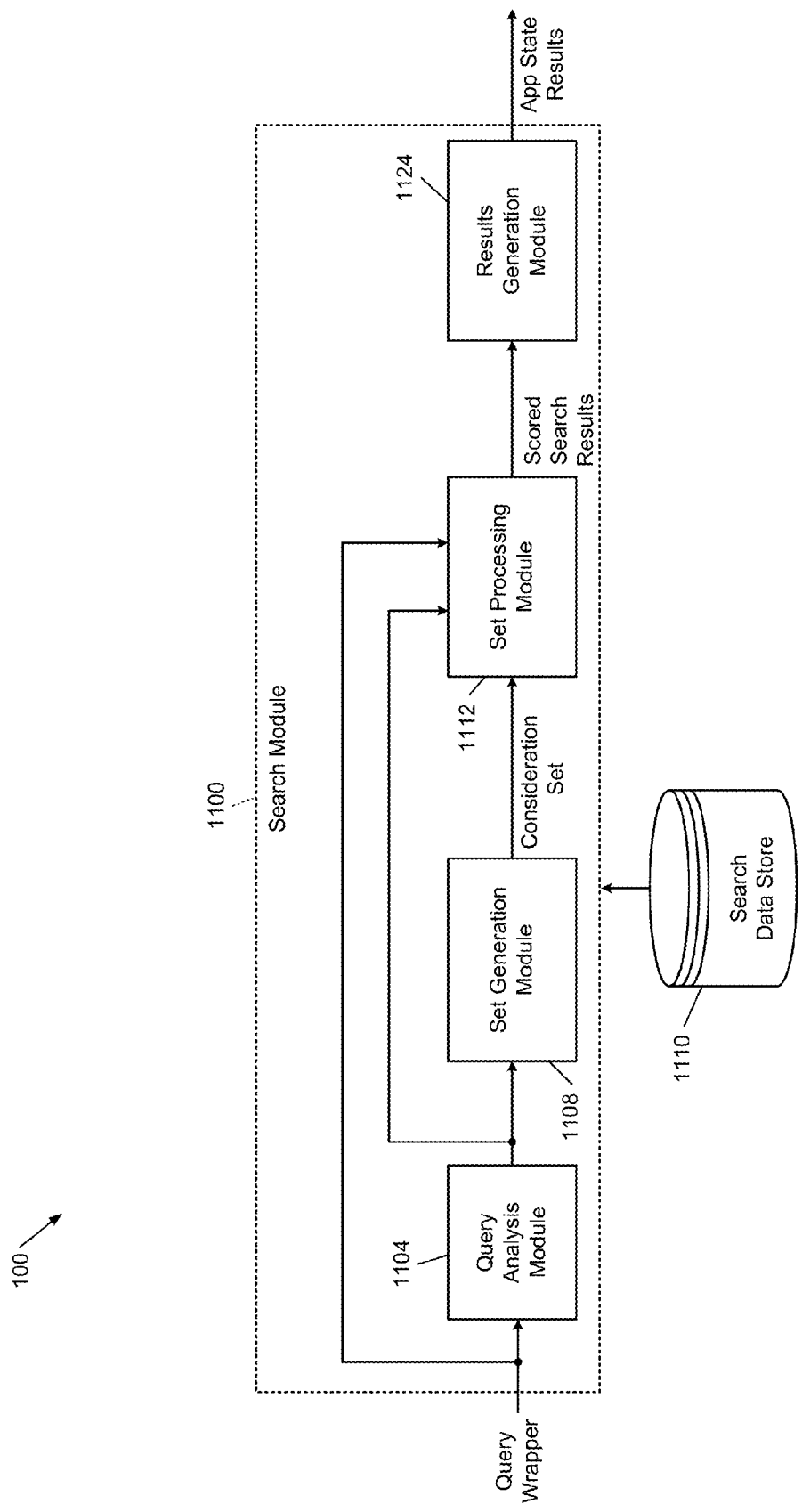
FIG. 13 is a functional block diagram of an example implementation of a search system.

In FIG. 13, an example implementation of the search system 132 includes a search module 1100. The search module 1100 includes a query analysis module 1104 that receives a query wrapper, such as the query wrapper of FIG. 1. The query analysis module 1104 analyzes the text query from the query wrapper. For example, the query analysis module 1104 may tokenize the query text, filter the query text, and perform word stemming, synonymization, and stop word removal. The query analysis module 1104 may also analyze additional data stored within the query wrapper. The query analysis module 1104 provides the tokenized query to a set generation module 1108.

The set generation module 1108 identifies a consideration set of app state records from a search data store 1110 based on the query tokens. In various implementations, the search data store 1110 may also include app records. In various implementations, an app record may be stored as an app state record that simply has a predetermined value, such as null, for the specific state of the app.

App state records in the search data store 1110 may be generated by crawling and scraping apps according to the principles of the present disclosure. Some or all of the contents of the records of the search data store 1110 may be indexed in inverted indices. In some implementations, the set generation module 1108 uses the APACHE LUCENE software library by the Apache Software Foundation to identify records from the inverted indices. The set generation module 1108 may search the inverted indices to identify records containing one or more query tokens. As the set generation module 1108 identifies matching records, the set generation module 1108 can include the unique ID of each identified record in the consideration set. For example, the set generation module 1108 may compare query terms to an app state name and app attributes (such as a text description and user reviews) of an app state record.

Further, in some implementations, the set generation module 1108 may determine an initial score of the record with respect to the search query. The initial score may indicate how well the contents of the record matched the query. For example, the initial score may be a function of term frequency-inverse document frequency (TF-IDF) values of the respective query terms.

A set processing module 1112 receives unique IDs of app state records identified by the set generation module 1108 and determines a result score for some or all of the IDs. A result score indicates the relevance of an app state with respect to the tokenized query and context parameters. In various implementations, a higher score indicates a greater perceived relevance.

In other words, the set processing module 1112 evaluates each candidate record from the consideration set in light of how relevant the candidate record is to the query wrapper as well as to the analyzed version of the query from the query analysis module 1104. For example, the query analysis module 1104 may infer a user's intent and identify multiple possible parses of the query. Each parse may be associated with a likelihood, and the set processing module may produce a score for a record based on a product of how well each query parse matches the record and how likely each query parse is. This gives higher weight to those records that are more relevant to the more likely query parses.

Beyond textual data, other items in the query wrapper may act as context parameters. Geolocation data may limit the score of (or simply remove altogether) apps that are not pertinent to the location of the user device. A blacklist in the query wrapper may cause the set processing module 1112 to remove app records and/or app state records from the consideration set that match the criteria in the blacklist, or to set their score to a null value, such as zero.

The set processing module 1112 may generate a result score based on one or more scoring features, such as record scoring features, query scoring features, and record-query scoring features. Example record scoring features may be based on measurements associated with the record, such as how often the record is retrieved during searches and how often links generated based on the record are selected by a user. Query scoring features may include, but are not limited to, the number of words in the search query, the popularity of the search query, and the expected frequency of the words in the search query. Record-query scoring features may include parameters that indicate how well the terms of the search query match the terms of the record indicated by the corresponding ID.

The set processing module 1112 may include one or more machine-learned models (such as a supervised learning model) configured to receive one or more scoring features. The one or more machine-learned models may generate result scores based on at least one of the record scoring features, the query scoring features, and the record-query scoring features.

For example, the set processing module 1112 may pair the search query with each app state ID and calculate a vector of features for each {query, ID} pair. The vector of features may include one or more record scoring features, one or more query scoring features, and one or more record-query scoring features. In some implementations, the set processing module 1112 normalizes the scoring features in the feature vector. The set processing module 1112 can set non-pertinent features to a null value or zero.

The set processing module 1112 may then input the feature vector for one of the app state IDs into a machine-learned regression model to calculate a result score for the ID. In some examples, the machine-learned regression model may include a set of decision trees (such as gradient-boosted decision trees). Additionally or alternatively, the machine-learned regression model may include a logistic probability formula. In some implementations, the machine-learned task can be framed as a semi-supervised learning task, where a minority of the training data is labeled with human-curated scores and the rest are used without human labels.

The machine-learned model outputs a result score of the ID. The set processing module 1112 can calculate result scores for each of the IDs that the set processing module 1112 receives. The set processing module 1112 associates the result scores with the respective IDs and outputs the most relevant scored IDs.

A results generation module 1124 may choose specific access mechanisms from the app records and app state records chosen by the set processing module 1112. The results generation module 1124 then prepares a results set to return to the user device. Although called "app state results" here, some of the access mechanisms may simply correspond to a default state (such as a home page) of an app.

The results generation module 1124 may select an access mechanism for an app state record based on whether the app is installed on the device. If the app is installed, an access mechanism that opens the app directly to the specified state is selected. Meanwhile, if the app is not installed, a selected access mechanism first downloads and installs the app, such as via a script, before opening the app to the specified state. Opening the app to the specified state may include a single command or data structure (such as an intent in the ANDROID operating system) that directly actuates the specified state. For other apps, a script or other sequence may be used to open the app to a certain state (such as a home, or default, state) and then navigate to the specified state.

The results generation module 1124 may generate or modify access mechanisms based on the operating system identity and version for the user device to which the results are being transmitted. For example, a script to download, install, open, and navigate to a designated state may be fully formed for a specific operating system by the results generation module 1124.

If the results generation module 1124 determines that none of the native access mechanisms are likely to be compatible with the user device, the search module 1100 may send a web access mechanism to the user device. If no web access mechanism is available or would be incompatible with the user device for some reason (for example, if the web access mechanism relies on the JAVA programming language, which is not installed on the user device), the results generation module 1124 may omit the result.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

What is claimed is:

1. A user device, comprising:
   a display;
   a memory;
   a communication circuit; and
   a processor, wherein the processor is configured to:
     display, on the display, a web browser including at least one graphical object for providing an advertisement content to a user,
     receive a user input for selecting the at least one graphical object displayed on the display,
     generate link information according to reception of the user input,
     determine whether a first software component for processing the link information is stored in the memory,
     in response to determining that the first software component is stored in the memory:
       identify, using the first software component, an installation of a first application for providing the advertisement content to the user, and
       execute the first application and provide the advertisement content using the first application to the user when the first application is installed in the user device, wherein the advertisement content is received from a first external electronic device via the communication circuit, and
     in response to determining that the first software component is not stored in the memory:
       transmit, via the communication circuit, the link information to a second external electronic device,
       receive, via the communication circuit, a second software component from the second external electronic device,
       identify, using the second software component, an installation of a second application for providing the advertisement content to the user, and
       execute the second application and provide the advertisement content using the second application when the second application is installed in the user device,
     wherein the first software component is included in a third application, and the second application and the third application are different applications from each other.

2. The user device of claim 1 wherein the processor is further configured to receive, via the communication circuit, a web redirection message from the second external electronic device.

3. The user device of claim 2 wherein the web redirection message include JavaScript instructions.

4. The user device of claim 1 wherein the first application and the second application are same applications each other.

5. The user device of claim 4, wherein the processor is further configured to:
   receive a query from the user, and
   provide, using the first application or the second application, a plurality of results in response to the query.

6. The user device of claim 5, wherein each of the plurality of results includes text and at least one image corresponding to a state of the first application or the second application.

7. The user device of claim 1,
   wherein the advertisement content includes text and at least one image.

8. A method for controlling a user device, comprising:
   displaying, on a display of the user device, a web browser including at least one graphical object for providing an advertisement content to a user;
   receiving a user input for selecting the at least one graphical object;
   generating link information according to receiving the user input;
   determining whether a first software component for processing the link information is stored in a memory of the user device displayed on the display;
   in response to determining that the first software component is stored in the memory:
     identifying, using the first software component, an installation of a first application for providing the advertisement content to the user, and
     executing the first application and provide the advertisement content using the first application when the first application is installed in the user device, wherein the advertisement content is received from a first external electronic device via a communication circuit of the user device; and in response to determining that the first software component is not stored in the memory:
- transmitting, via the communication circuit, the link information to a second external electronic device,
- receiving, via the communication circuit, a second software component from the second external electronic device,
- identifying, using the second software component, an installation of a second application for providing the advertisement content to the user, and
- executing the second application and provide the advertisement content using the second application when the second application is installed in the user device, wherein the first software component is included in a third application, and wherein the second application and the third application are different applications from each other.

9. The method of claim 8, wherein the method is further comprising receiving, via the communication circuit, a web redirection message from the second external electronic device.

10. The method of claim 9, wherein the web redirection message include JavaScript instructions.

11. The method of claim 8, wherein the first application and the second application are same applications each other.

12. The method of claim 8, further comprising:
- receiving a query from the user, and
- providing, using the first application or the second application, a plurality of results in response to the query.

13. The method of claim 12 wherein each of the plurality of results includes text and at least one image corresponding to a state of the first application or the second application.

14. The method of claim 8,
wherein the advertisement content includes text and at least one image.

* * * * *